United States Patent
Choi et al.

(10) Patent No.: US 10,062,883 B2
(45) Date of Patent: Aug. 28, 2018

(54) NON-STOP BATTERY CHANGING SYSTEM

(71) Applicant: Daegu Gyeongbuk Institute of Science and Technology, Daegu (KR)

(72) Inventors: Youn Ho Choi, Daegu (KR); Oh Seok Kwon, Daegu (KR); Dong Ha Lee, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 762 days.

(21) Appl. No.: 14/609,430

(22) Filed: Jan. 30, 2015

(65) Prior Publication Data
US 2015/0311487 A1 Oct. 29, 2015

(30) Foreign Application Priority Data
Apr. 24, 2014 (KR) .................. 10-2014-0049436

(51) Int. Cl.
*H01M 2/10* (2006.01)
*H01M 2/00* (2006.01)
*B60S 5/06* (2006.01)
*B60L 11/18* (2006.01)

(52) U.S. Cl.
CPC ....... *H01M 2/1083* (2013.01); *B60L 11/1822* (2013.01); *B60S 5/06* (2013.01); *H01M 2/00* (2013.01); *H01M 2/1077* (2013.01); *H01M 2220/20* (2013.01)

(58) Field of Classification Search
CPC .................................................. H01M 2/1083
See application file for complete search history.

(56) References Cited

U.S. PATENT DOCUMENTS

2014/0130344 A1* 5/2014 Choi ............... H01M 2/1016
29/729

FOREIGN PATENT DOCUMENTS

| KR | 10-2003-0080272 A | 10/2003 |
|---|---|---|
| KR | 20-0365781 Y1 | 10/2004 |
| KR | 10-2005-0019544 A | 3/2005 |
| KR | 10-0753398 B1 | 8/2007 |

* cited by examiner

*Primary Examiner* — Sarah A. Slifka
(74) *Attorney, Agent, or Firm* — Revolution IP, PLLC

(57) ABSTRACT

There is provided a non-stop battery changing system that includes: a body connected to a moving body that is moved by power, having a seat on a side, and having locking grooves and a power terminal in the seat; a battery pack inserted in the seat of the body to supply power to the moving body, having locking protrusions sliding inward/outward, and having a battery terminal that comes in contact with the power terminal; and a pushing protrusion extending outward from a side of the battery pack in a mounting direction of the battery pack inserted in the seat by movement of the moving body, and unlocking the locking protrusions out of the locking grooves, when the battery pack used in the seat is replaced with another charged battery pack.

12 Claims, 6 Drawing Sheets

NON-STOP BATTERY CHANGING SYSTEM

CROSS-REFERENCE TO RELATED APPLICATIONS

This application claims the priority of Korean Patent Application No. 10-2014-0049436 filed on Apr. 24, 2014, in the Korean Intellectual Property Office, the disclosure of which is incorporated herein by reference.

BACKGROUND OF THE INVENTION

Field of the Invention

The present invention relates to a battery changing system, and more particularly, to a non-stop battery changing system that can change a battery without stopping a vehicle equipped with the battery.

Description of the Related Art

In general, when a system that uses a battery as a power such as an electric vehicle and a mobile phone exhausts the energy of the battery, it is used again by changing the battery or connecting another power to its body and charging the battery with the power. A battery is usually changed in the way of stopping a system such as an electric vehicle and a robot in operation, separating the battery, and then mounting a charged battery.

However, according to this type of changing a battery in the related art, it is required to stop the system in operation in order to separate the battery from the system, so power has to be shut off and the system has to be stopped while the power is shut off.

The background art of the present invention has been described in Korean Patent Publication No. 2005-0019544 (2005.03.03).

SUMMARY OF THE INVENTION

The present invention provides a non-stop battery changing system that can replace a used battery in a battery-driven apparatus with a charged new battery during operation, while ensuring the seamless operation of the apparatus.

According to an aspect of the present invention, there is provided a non-stop battery changing system including: a body connected to a moving body that is moved by power, having a seat on a side that is open in the movement direction of the moving body, and having locking grooves and a power terminal in the seat; a battery pack inserted in the seat of the body to supply power to the moving body, having locking protrusions sliding inward/outward to be locked/unlocked in/out of the locking grooves, and having a battery terminal that comes in contact with the power terminal; and a pushing protrusion extending outward from a side of the battery pack in a mounting direction of the battery pack inserted in the seat by movement of the moving body, and unlocking the locking protrusions out of the locking grooves, when the battery pack used in the seat is replaced with another charged battery pack.

The locking protrusions may be formed on a side and the other side of the battery pack and the locking grooves may be formed on an end and the other end of the body.

The locking protrusions may have the shape of a bar and slide perpendicular to the mounting direction of the battery pack, and may be elastically supported by springs.

The power terminal may have a power anode and a power cathode arranged horizontally and spaced from each other, the battery terminal may have a battery anode and a battery cathode arranged horizontally, spaced from each other, and coming in contact with the power anode and the power cathode, respectively, the power cathode, the battery anode, and the battery cathode may extend in the mounting direction of the battery pack, and the power anode may have a first connection electrode and a second connection electrode spaced from each other in the mounting direction of the battery pack.

The power anode may further have a power connection electrode, which is electrically connected with the first connection electrode, the second connection electrode, and the moving body, and diodes between the first connection electrode and the second connection electrode that are connected with the power connection electrode.

The length of the battery anode may be larger than the distance between the first connection electrode and the second connection electrode.

The length of the power cathode may be larger than the sum of the length of the battery anode and the length of the first connection electrode or the length of the second connection electrode of the power anode.

The length of the battery pack may be smaller than the sum of the length of the battery anode and the length of the power cathode.

A protrusion groove corresponding to the pushing protrusion may be formed at the other end of the battery pack, and the battery pack may have: triggers sliding perpendicular to the mounting direction of the battery pack; a pair of pressing springs elastically supporting the triggers such that longitudinal free ends of the triggers protrude over the protrusion groove; and link mechanisms unlocking the locking protrusions out of the locking grooves by being operated by the triggers that are pushed when the pushing protrusion is inserted into the protrusion groove.

The link mechanism may be an assembly of a rack and a pinion.

The link mechanism may move the trigger and the locking protrusion in opposite direction.

Both ends of the body may be bent down, and holding portions may be horizontally bent from the edges of the bending ends of the body.

The pushing protrusion may have the shape of a wedge having a triangular edge.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, exemplary embodiments of the present invention are described in detail with reference to the accompanying drawings.

Figure 1:
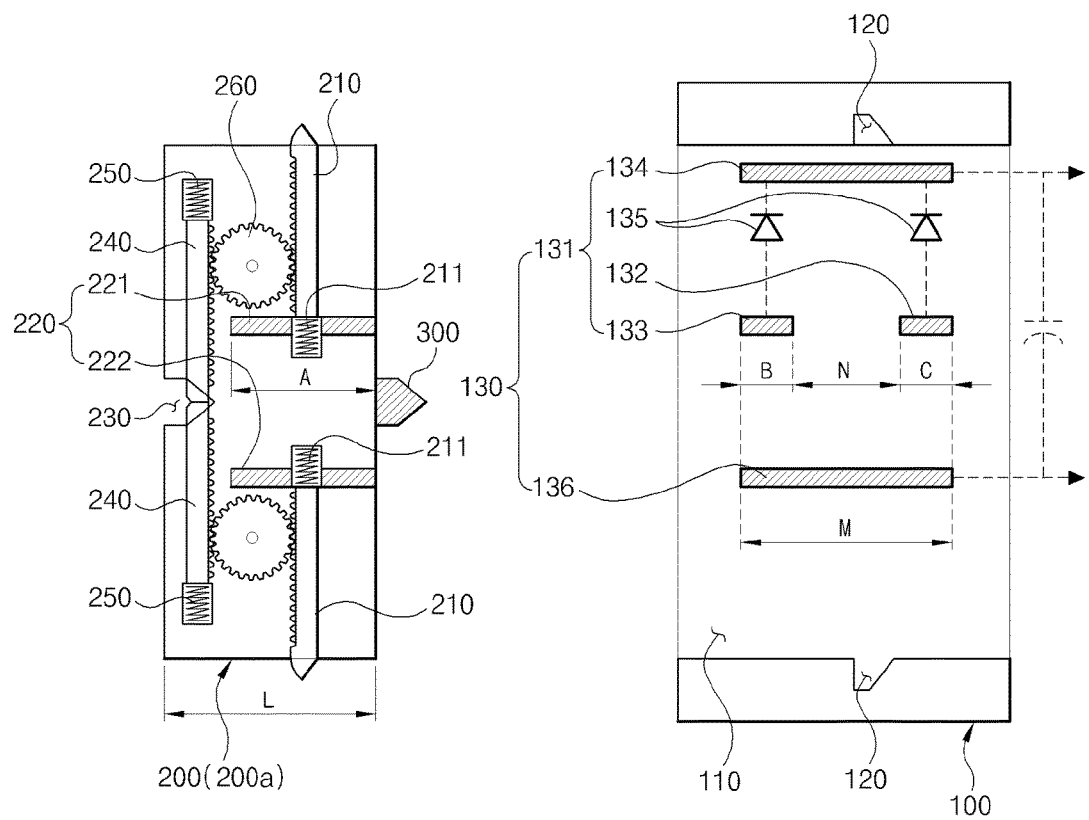
FIG. 1 is a cross-sectional view showing the configuration of a non-stop battery changing system according to an embodiment of the present invention.
Figure 2:
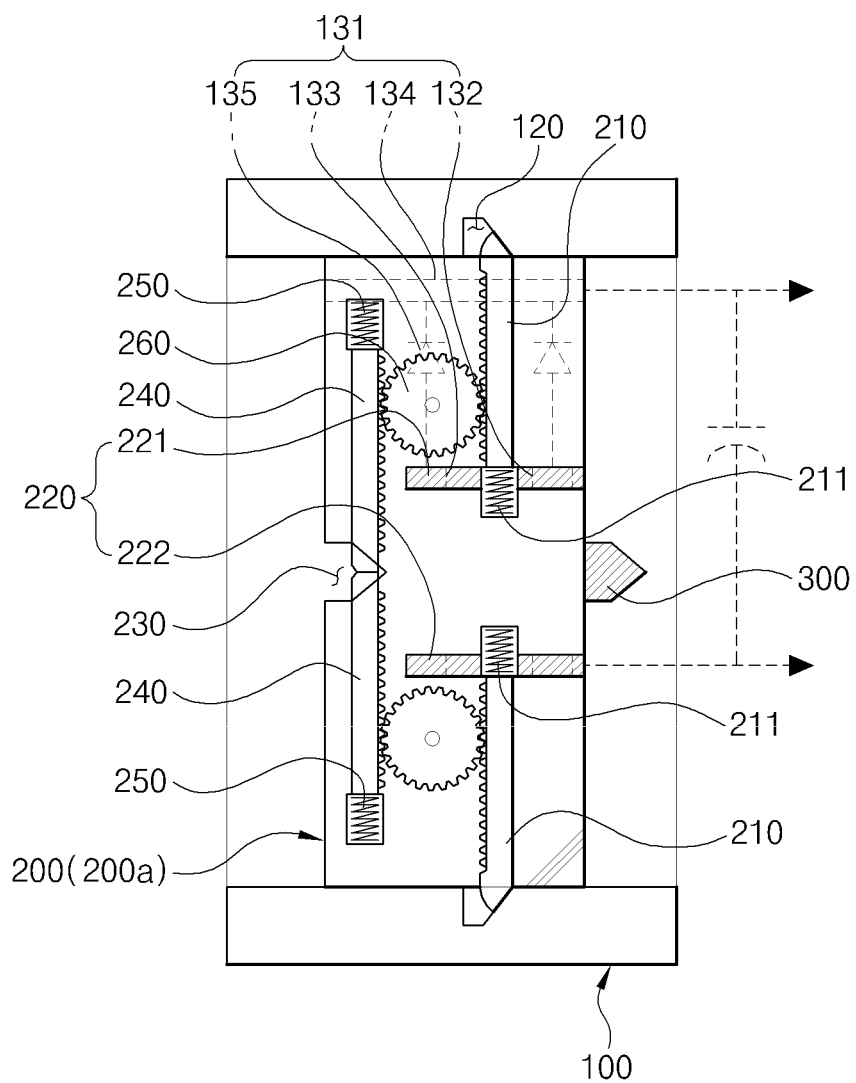
FIG. 2 is a view showing the assembly of the system shown in FIG. 1.
Figure 3:
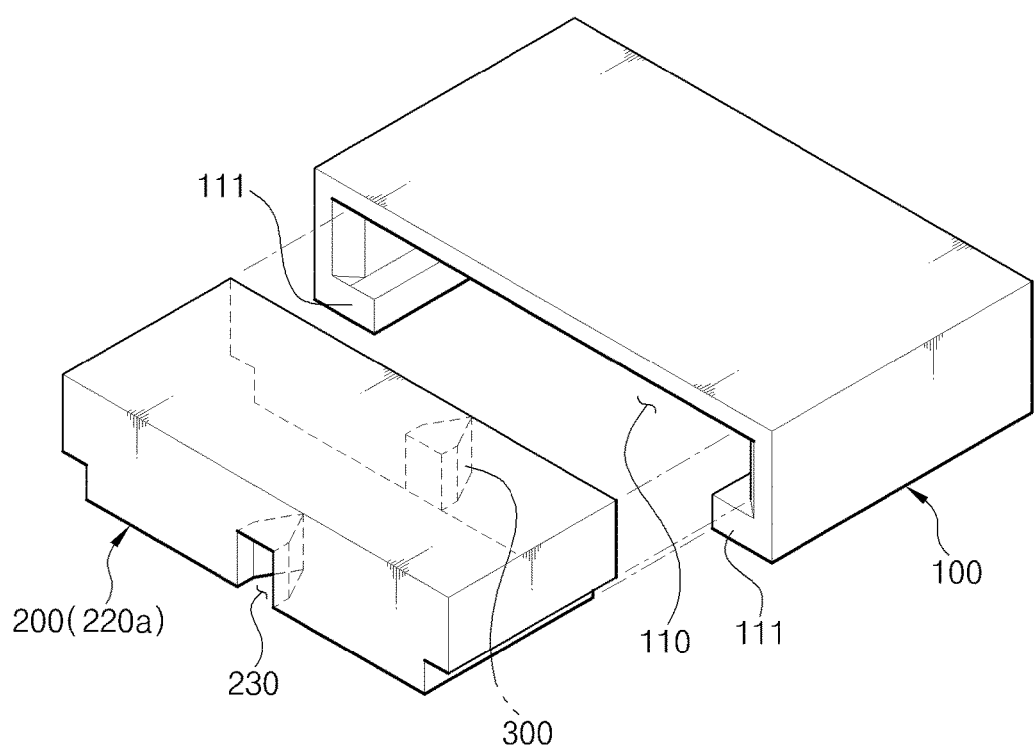
FIG. 3 is a perspective view schematically showing the system shown in FIG. 1.

FIG. 1 is a cross-sectional view showing the configuration of a non-stop battery changing system according to an embodiment of the present invention, FIG. 2 is a view showing the assembly of the system shown in FIG. 1, and FIG. 3 is a perspective view schematically showing the system shown in FIG. 1. Referring to FIGS. 1 to 3, the non-stop battery changing system includes a body 100, a battery pack 200, and a changing protrusion 300, so when it replace a used battery pack 200 by a fully charged battery pack 200a on a moving body (not shown) such as a robot or an electric vehicle, it changes the battery packs without power of the moving body shut off. The moving body may have a built-in power management unit receiving power from the battery pack 200 (200a), so it can perform various operations using power supplied from the power management unit.

The body 100 is coupled to the moving body and moves with the moving body. A seat 110 that is a space in which a battery pack 200 (200a) to be described below can be inserted is formed on a side of the body 100. The seat 110 is open such that the battery pack 200 (200a) can be inserted when the moving member is moved. That is, both ends of the body 100 is bent down and holding portions 111 may be horizontally bent from the edge of the bending ends to hold the battery pack 200 (200a) inserted between the bending ends inside the body 100. Since the seat 110 is open in the movement direction of the moving body, the battery pack 200 (200a) is inserted/pulled into/out of the seat 110 for replacement by moving the moving body.

Locking grooves 120 that communicate with the seat 110 may be formed inside the body 100. The locking grooves 120 are formed at the bending ends of the body 100, facing each other. That is, the locking grooves 120 are arranged to face each other in the line perpendicular to the battery pack 200 (200a) inserted into the seat 110. Ends of locking protrusions 210 of the battery pack 200 (200a) are inserted and locked in the locking grooves 120.

A power terminal 130 that receives power from the battery pack 200 (200a) and transmits it to the moving body is formed at the body 100. That is, the power terminal 130 is formed on the seat 110 of the body 100 and electrically connected with the battery pack 200 (200a) inserted in the seat 110 inside the body 100. The power terminal 130 has a power anode 131 and a power cathode 136. The power anode 131 and the power cathode 136 are disposed horizontally and spaced from each other, extending in the mounting direction of the battery pack 200 (200a), such that when the battery pack 200 (200a) is mounted for replacement, they can keep in electric contact with the battery pack 200 (200a). The power anode 131 is in contact with a battery anode 221 of the battery pack 200 (200a) and the power cathode 136 is in contact with a battery cathode 222 of the battery pack 200 (200a).

The power anode 131 is composed of a first connection electrode 132 and a second connection electrode 133. The first connection electrode 132 and the second connection electrode 133 are spaced at a predetermined from each other in the mounting direction of the battery pack 200 (200a). Accordingly, when the used battery pack 200 in the seat 110 is replaced with a fully charged battery pack 200a, the battery anode 221 of the used battery pack 200 keeps in contact with the first connection electrode 132 until it comes out of the seat 110 and the battery anode 221 of the fully charged battery pack 200 inserted into the seat 110 keeps in contact with the second connection electrode 133, such that it is possible to keep supplying power to the moving body.

The distance N between the first connection electrode 132 and the second connection electrode 133 is shorter than the length A of the battery anode 221 of the battery pack 200a.

A power connection electrode 134 and diodes 135 may be further connected to the power anode 131. The power connection electrode 134 is electrically connected to the first connection electrode 132, the second connection electrode 133, and the power management unit of the moving body, so it transmits the power, which is supplied from the battery pack 200 (200a) through the first connection electrode 132 and the second connection electrode 133, to the power management unit of the moving body. The power connection electrode 134 is formed at the body 100. The diodes 135 are connected respectively between the power connection electrode 134 and the first connection electrode 132 and between the power connection electrode 134 and the second connection electrode 133. The diode 135 prevents a current from flowing to the used battery pack 200 from the fully charged battery pack 200a, when the battery anode 221 of the fully charged battery pack 200a is in contact with the second connection electrode 133 and the battery anode 221 of the discharge battery pack 200 is in contact with the first connection electrode 132, after the battery pack 200 (200a) is changed.

The battery pack 200 (200a) is electrically connected the power terminal 130 of the body 100 and supplies power to the power management unit of the moving body, when it is inserted in the seat 110 of the body 100, so the moving body can move. The battery pack 200 (200a) has the locking protrusions 210 each having a longitudinal end that is inserted and locked in the locking grooves 120 of the body 100.

The locking protrusions 210, which are bars having a predetermined length, can slide inward/outward on the battery pack 200 (200a). The locking protrusions 210 are disposed on the battery pack 200 (200a) and slide perpendicular to the battery pack 200 (200a) inserted in the seat 110 of the body 100. At least one locking protrusion 210 may be disposed on the battery pack 200 (200a), but in the embodiment, a pair of locking protrusions 210 is disposed and slide at both sides of the battery pack 200 (200a) facing both bending ends of the body 100. The locking protrusions 210 are arranged perpendicular to the battery pack 200 (200a) inserted in the seat 110 of the body 100.

Longitudinal free ends of the locking protrusions 210 are inserted and locked in the locking grooves 120 of the body 100 by protruding outward on the battery pack 200 (200a), such that the locking protrusions 210 fix the battery pack 200 (200a) in the seat 110 of the body 100. On the other hand, when the free ends of the locking protrusions 210 slide inward on the battery pack 200 (200a), they are unlocked from the locking grooves 120 of the body 100, so the battery pack 200 (200a) fixed inside the body 100 can be separated. The longitudinal fixed ends of the locking protrusions 210 are elastically supported by springs 211. Accordingly, the free ends of the locking protrusions 210 keep protruding outward by elastic force of the springs 211, when they are not forcibly pulled inward on the battery pack 200 (200a), so the free ends are stably inserted and locked in the locking protrusions 120 of the body 100.

Further, a battery terminal 220 that comes in contact with the power terminal 130 of the body 100 is formed on the battery pack 200 (200a). The battery terminal 220 transmits power of the battery pack 200 (200a) to the body 100. The battery terminal 220 has the battery anode 221 and the battery cathode 222. The battery anode 221 comes in contact with the first and second connection electrodes 132 and 133 of the power anode 131 of the power terminal 130 and the battery cathode 222 comes in contact with the power cathode 136 of the power terminal 130. The battery anode 221 and the battery cathode 222 are formed on a side of the battery pack 200 (200a), that is, the side facing the bottom of the body 100 on which the power terminal 130 is formed, when the battery pack 200 (200a) is inserted in the seat 110 of the body 100. The battery anode 221 and the battery cathode 222 are horizontally arranged and spaced from each other, extending in the mounting direction of the battery pack 200 (200a) inserted in the seat 110 of the body 100, such that they can stably keep in electric contact with the first and second connection electrodes 132 and 133 of the power anode 131 and the power cathode 136 of the power terminal 130, when the battery pack 200 (200a) is moved for replacement. Since the battery anode 221 is longer than the distance between the first and second connection electrodes 132 and 133 of the body 100, as described above, the battery anode 221 can keep in contact with the first and second connection electrodes 132 and 133 of the power anode 131, when the battery pack 200 (200a) is replaced.

The length of the battery pack 200 (200a), that is, the length L in the mounting direction of the battery pack 200 (200a) inserted in the seat 110 of the body 100 is smaller than the sum of the length A of the battery anode 221 and the length M of the power cathode 136. The length M of the power cathode 136 is larger than the sum of the length of the battery anode 221 and the length C of the first connection electrode 132 or the length B of the second connection electrode 133 of the power anode 131. Accordingly, when the battery pack 200 (200a) is replaced, the battery anode 221 of the battery pack 200 (200a) keeps in contact with the first connection electrode 132 and the second connection electrode 133 of the power anode 131, such that it is possible to keep supplying power to the moving body.

Further, a pushing protrusion 300 and a protrusion groove 230 are formed at the longitudinal sides of the battery pack 200 (200a), that is, the sides in the mounting direction of the battery pack 200 (200a) inserted in the seat 110 of the body 100. The pushing protrusion 300 to be described below protrudes in the mounting direction on a side of the battery pack 200 (200a) and the protrusion groove 230 is formed at the other side of the battery pack 200 (200a) to receive the pushing protrusion 300. That is, the pushing protrusion 300 is fitted into the protrusion groove 230, when the used battery 200 is replaced with the fully charged battery pack 200a. The protrusion groove 230 and the pushing protrusion 300 have corresponding shapes.

Further, the battery pack 200 (200a) has triggers 240, pressing springs 250, and link mechanisms 260 for unlocking the locking protrusions 210 of the used battery pack 200 in the seat 110 of the body 100 out of the locking grooves 120 of the body 100.

The triggers 240, which are bars having a predetermined length, can slide inward/outward over the protrusion groove 230, on the battery pack 200 (200a). The triggers 240 are disposed on the battery pack 200 (200a) and slide perpendicular to the battery pack 200 (200a) inserted in the seat 110 of the body 100. Longitudinal free ends of the triggers 240 are disposed over the protrusion groove 230 of the battery pack 200 (200a), such that they are pushed inward on the battery pack 200 (200a), as the pushing protrusion 300 is inserted into the protrusion groove 230. At least one trigger may be disposed on the battery pack 200 (200a), but in the embodiment, a pair of triggers 240 is disposed on the battery pack 200 (200a), with their free ends facing each other.

The pressing springs 250 elastically support the triggers 240 so that the free ends of the triggers 240 keep protruding over the protrusion groove 230. The pressing springs 250 are coupled to longitudinal fixed ends of the triggers 240. The pressing springs 250 keep the free ends of the triggers 240 over the protrusion groove 230, when the pushing protrusion 300 is not inserted in the protrusion groove 230. Further, when a pair of triggers 240 is provided, the pressing springs 250 keep the free ends of the triggers 240 in contact with each other over the protrusion groove 230.

The link mechanisms 260 move the locking protrusions 210, as the pushing protrusion 300 is inserted into the protrusion groove 230 of the battery pack 200 (200a) and opens the triggers 240 so that the locking protrusions 210 can be unlocked out of the locking grooves 120 of the body 100. The link mechanisms 260 connect the triggers 240 and the locking protrusions 210 to each other on the battery pack 200 (200a). The link mechanisms 260 slide the triggers 240 and the locking protrusions 210 in opposite directions. In this embodiment, the link mechanism 260 is an assembly of a rack and a pinion. The rack is disposed on the sides facing each other of the trigger 240 and the locking protrusion 210 and the pinion is disposed between the trigger 240 and the locking protrusion 210 and engaged with the racks on the trigger 240 and the locking protrusion 210.

When the used battery pack 200 in the seat 110 of the body 100 is replaced with the fully charged battery pack 200a, the pushing protrusion 300 is inserted into the protrusion groove 230 and the locking protrusions 210 are unlocked out of the locking grooves 120 of the body 100, such that the used battery pack 200 can be separated out of the seat 110 of the body 100. The pushing protrusion 300 extends outward in the mounting direction of the battery pack 200 (200a) inserted in the seat 110 of the body 100. That is, the pushing protrusion 300 protrudes from a longitudinal side of the battery pack 200 (200a), that is, a side in the mounting direction of the battery pack 200 (200a) inserted in the seat 110 of the body 100. The pushing protrusion 300 has the shape of a wedge having a triangular edge, so when it is fully inserted in the protrusion groove 230, that is, when the used battery pack 200 and the fully charged battery pack 200a for replacement are in close contact with each other on the body 100, the locking protrusions 210 are unlocked out of the locking grooves 120, such that the used battery pack 200 can be separated out of the seat 110 of the body 100. In order to replace the used battery pack 200 with the full charged battery pack 200a, the pushing protrusion 300 should be fully inserted in the protrusion groove 230, that is, the battery packs 200 and 200a should be in close contact with each other, and accordingly, the battery terminals of the battery packs 200 and 200a can stably keep in contact with the power terminal 130 of the body 100.

The operation for changing a battery by the non-stop battery changing system having the configuration according to an embodiment is described with reference to FIGS. 1 to 6.

First, the battery pack 200 is put into the seat 110 of the body 100 connected to the moving body and the moving body is operated by the power from the battery pack 200.

Thereafter, when the remaining capacity of the battery pack 200 used in the seat 110 of the body 100 decreases to a level determined by the power management unit of the moving body, the moving body moves to the fully charged battery pack 200a for replacement.

The moving body moves the body 100 toward the battery pack 200a for replacement, with the battery pack 200 in the seat 110 of the body 100 and the fully charged battery pack 200a for replacement arranged in serial.

Figure 4:
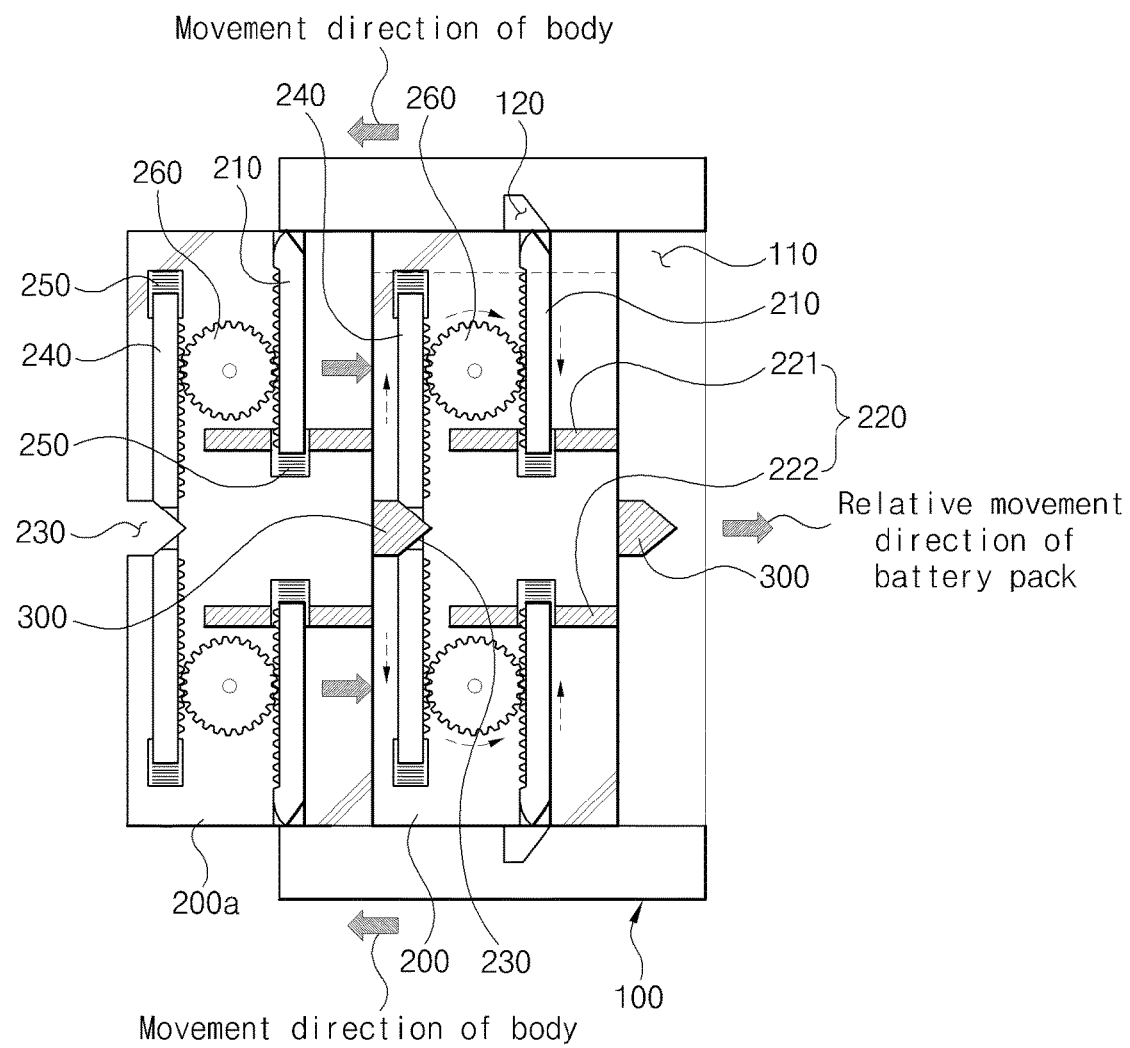
FIGS. 4 to 6 are views showing the operation of the non-stop battery changing system according to an embodiment of the present invention.

As shown in FIG. 4, when the pushing protrusion 300 of the fully charged battery pack 200a for replacement is fully inserted in the protrusion groove 230 of the battery pack 200 used in the seat 110 of the body 100, the locking protrusion 210 of the used battery pack 200 are unlocked out of the locking groove 120 of the body 100.

Figure 5:
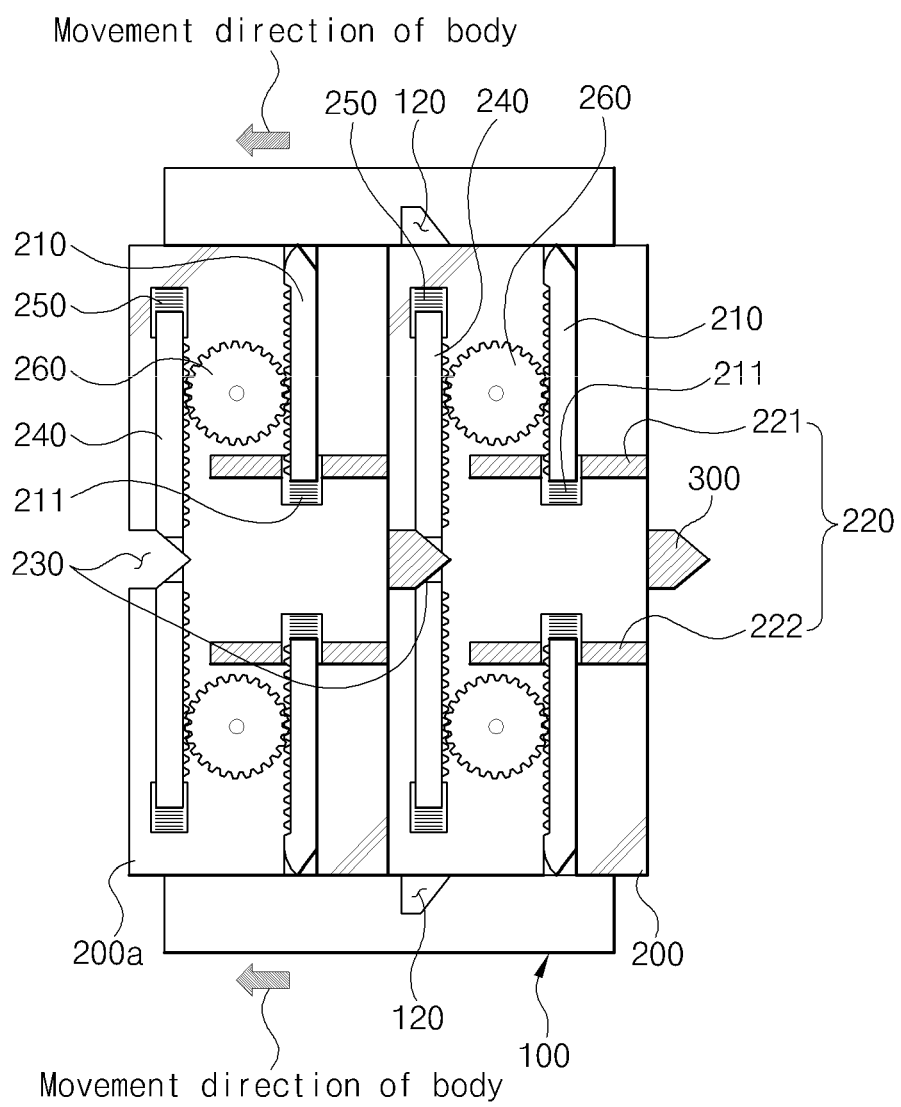

Thereafter, as shown in FIG. 5, as the moving body keeps moving, the fully charged battery pack 200a for replacement is inserted into the seat 110 of the body 100 and the used battery pack 200 is pushed out of the seat 110 of the body 100 by the fully charged battery pack 200a and separated from the seat 110 of the body 100. When the fully charged battery pack 200a is inserted in the seat 110 of the body 100, the battery anode 221 of the battery terminal 220 of the battery pack 200a comes in contact with the second connection electrode 133 of the power anode 131 of the body 100 and the battery cathode 222 comes in contact with the power cathode 136, so the battery pack 200a supplies power to the power management unit of the moving body. Further, the battery anode 221 of the used battery pack 200 pushed out of the seat 110 of the body 100 comes in contact with the first connection electrode 132 of the power anode 131 of the body 100 and the battery cathode 222 comes in contact with the power cathode 136 of the body 100, so the battery pack 200 supplies the remaining power to the power management unit of the moving body while being separated. When power is supplied to the moving body through the power connection electrode 134 from the first connection electrode 132 and the second connection electrode 133, the current flowing from the fully charged battery pack 200a to the power connection electrode 134 through the second connection electrode 133 cannot flow to the used battery pack 200 due to the diodes 135 so power is stably supplied to the moving body.

Figure 6:
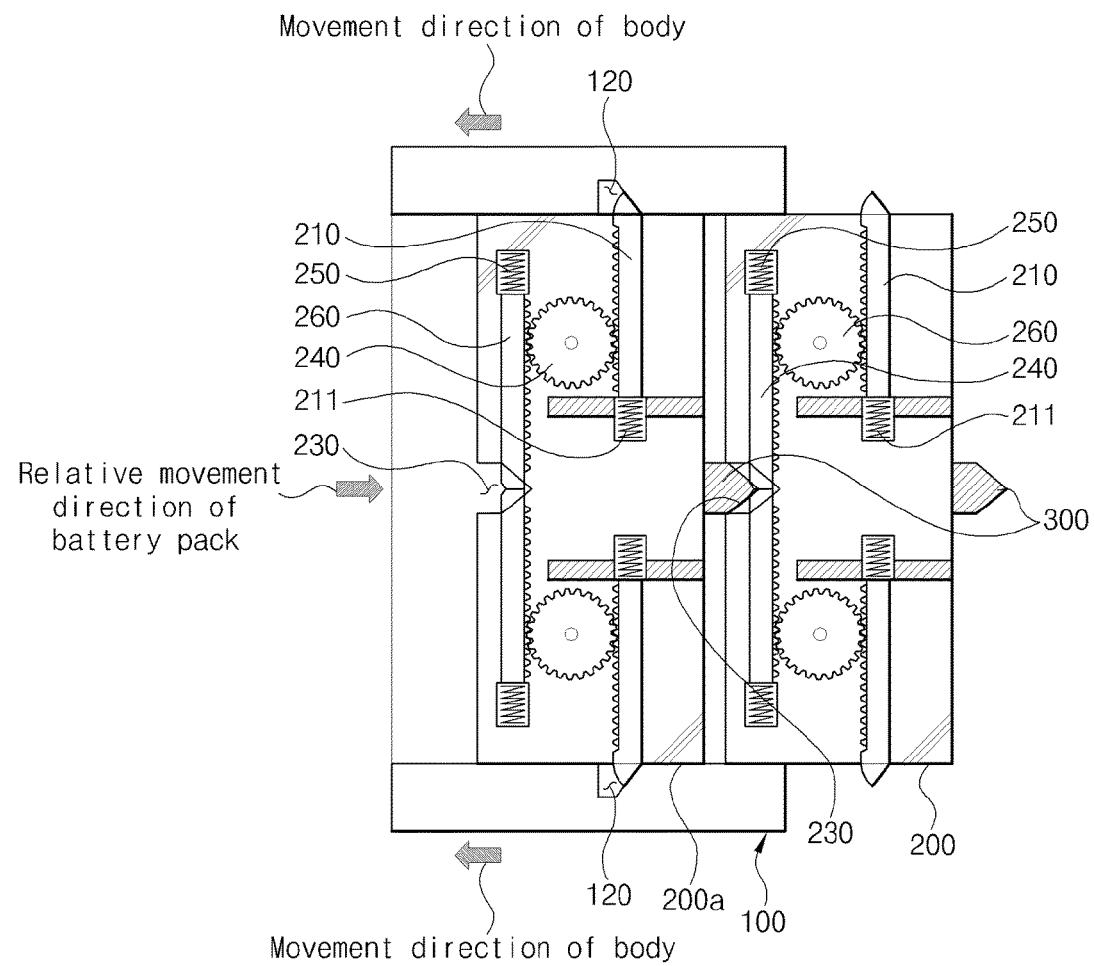

Thereafter, as shown in FIG. 6, with the fully charged battery pack 200a completely inserted in the seat 110 of the body 100, the locking protrusions 210 of the battery pack 200a are inserted and locked in the locking grooves 120 of the body 100, such that the battery pack 200a is fixed inside the body 100.

According to the non-stop battery changing system according to an embodiment, as described above, in order to replace the battery pack 200 used in the seat 110 of the body 100 with the fully charged battery pack 200a, when the moving body is moved so that the used battery pack 200 comes in close contact with the fully charged battery pack 200a, the pushing protrusion 300 of the fully charged battery pack 200a pushes the used battery pack 200, so the locking protrusions 210 of the used battery pack 200 are unlocked out of the locking grooves 120 of the body 100. In this process, the fully charged battery pack 200a is inserted into the seat 110 of the body 100, with the battery terminals 220 of the battery packs 200 and 200a keeping in contact with the power terminal 130 of the body 100, such that power supplied to the moving body is not cut and the moving body can keep moving.

As set forth above, according to exemplary embodiments of the invention, in order to replace the battery pack used in the seat of the body with a fully charged battery, when the moving body is moved to bring the used battery pack and the fully charged battery pack come in close contact with each other, the pushing protrusion of the fully charged battery pack pushes the used battery pack, such that locking protrusions are unlocked out of the locking grooves of the body. In this process, the fully charged battery pack is inserted into the seat of the body, with the battery terminals of the battery packs keeping in contact with the power terminal of the body, such that power supplied to the moving body is not cut and the moving body can keep moving.

While the present invention has been shown and described in connection with the exemplary embodiments, it will be apparent to those skilled in the art that modifications and variations can be made without departing from the spirit and scope of the invention as defined by the appended claims.

What is claimed is:

1. A non-stop battery changing system comprising:
a body connected to a moving body that is moved by power, having a seat on a side that is open in the movement direction of the moving body, and having locking grooves and a power terminal in the seat;
a battery pack inserted in the seat of the body to supply power to the moving body, having locking protrusions sliding inward/outward to be locked/unlocked in/out of the locking grooves, and having a battery terminal that comes in contact with the power terminal; and
a pushing protrusion extending outward from a side of the battery pack in a mounting direction of the battery pack inserted in the seat by movement of the moving body, and unlocking the locking protrusions out of the locking grooves, when the battery pack used in the seat is replaced with another charged battery pack,
wherein the power terminal has a power anode and a power cathode arranged horizontally and spaced from each other,
the battery terminal has a battery anode and a battery cathode arranged horizontally, spaced from each other, and coming in contact with the power anode and the power cathode, respectively,
the power cathode, the battery anode, and the battery cathode extend in the mounting direction of the battery pack, and
the power anode has a first connection electrode and a second connection electrode spaced from each other in the mounting direction of the battery pack, and
wherein the power anode further has a power connection electrode, which is electrically connected with the first connection electrode, the second connection electrode, and the moving body, and diodes between the first connection electrode and the second connection electrode that are connected with the power connection electrode.

2. The system of claim 1, wherein the locking protrusions are formed on a side and the other side of the battery pack, and
the locking grooves are formed on an end and the other end of the body.

3. The system of claim 2, wherein the locking protrusions have the shape of a bar, slide perpendicular to the mounting direction of the battery pack, and are elastically supported by springs.

4. The system of claim 1, wherein the locking protrusions have the shape of a bar, slide perpendicular to the mounting direction of the battery pack, and are elastically supported by springs.

5. The system of claim 1, wherein the length of the battery anode is larger than the distance between the first connection electrode and the second connection electrode.

6. The system of claim 1, wherein the length of the power cathode is larger than the sum of the length of the battery anode and the length of the first connection electrode or the length of the second connection electrode of the power anode.

7. The system of claim 1, wherein the length of the battery pack is smaller than the sum of the length of the battery anode and the length of the power cathode.

8. The system of claim 1, wherein a protrusion groove corresponding to the pushing protrusion is formed at the other end of the battery pack, and the battery pack has:
triggers sliding perpendicular to the mounting direction of the battery pack;
a pair of pressing springs elastically supporting the triggers such that longitudinal free ends of the triggers protrude over the protrusion groove; and
link mechanisms unlocking the locking protrusions out of the locking grooves by being operated by the triggers that are pushed when the pushing protrusion is inserted into the protrusion groove.

9. The system of claim 8, wherein the link mechanism is an assembly of a rack and a pinion.

10. The system of claim 8, wherein the link mechanism moves the trigger and the locking protrusion in opposite direction.

11. The system of claim 1, wherein both ends of the body are bent down, and holding portions are horizontally bent from the edges of the bending ends of the body.

12. The system of claim 1, wherein the pushing protrusion has the shape of a wedge having a triangular edge.

\* \* \* \* \*